Patented Dec. 16, 1952

2,622,089

UNITED STATES PATENT OFFICE 2,622,089

METHOD OF REFORMING NATURAL GAS TO PRODUCE HYDROGEN AND CARBON MONOXIDE SYNTHESIS GAS

Bertrand J. Mayland, Bartlesville, Okla., assignor to Phillips Petroleum Company, a corporation of Delaware No Drawing. Application September 5, 1947, Serial No. 772,460

1 Claim. (Cl. 252—373)

This invention relates to an improved process for the manufacture of carbon monoxide and hydrogen. In one embodiment this invention relates to an improved process for the manufacture of carbon monoxide and hydrogen from hydrocarbons. In one specific embodiment it relates to an improved method for operating a gas reforming unit wherein synthesis gas is produced from natural gas, carbon dioxide and steam.

In conventional gas reforming units for the production of hydrogen and carbon monoxide gas mixtures suitable for use in synthesizing alcohols, aldehydes, hydrocarbons, etc., natural gas is passed over reduced nickel oxide catalyst at about 1400° F. in the presence of carbon dioxide and steam. Both water and carbon dioxide in the feed to the unit not only enter into the reaction, but also serve the purpose of preventing excessive carbon deposition on the reforming catalyst. The predominating reactions may be represented as follows:

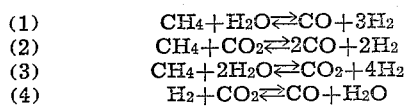

Reaction 2 proceeds more rapidly than either 1 or 3. Consequently, the reforming of the natural gas is effected primarily by the carbon dioxide. The gases, therefore, contain a considerable amount of unconsumed water. This water will in turn react with the carbon monoxide in the gas mixture according to Reaction 4 consuming carbon monoxide, one of the desired products, to give carbon dioxide and hydrogen. To suppress this reaction and to assure substantially complete conversion of the natural gas an excess of carbon dioxide over that consumed in the reforming reaction is maintained in the feed. The resultant effluent gases from the reforming unit are treated for water and carbon dioxide removal. The water is usually removed by cooling to condensation temperatures and separating the liquid from the gases. Carbon dioxide may be removed by scrubbing the gases with a caustic solution, or by scrubbing the gases with water at elevated pressures, or the like.

My invention provides a method whereby larger quantities of hydrogen-carbon monoxide synthesis gas mixtures can be obtained with a given quantity of carbon dioxide in the feed to a hydrocarbon reforming unit. I have found that by using a high space velocity of the feed gases, which comprises hydrocarbon, carbon dioxide and water, through the reforming unit, that I can produce a given mol ratio of hydrogen to carbon monoxide utilizing less than the theoretical concentration of carbon dioxide. This is particularly true when using a high mol ratio of water with hydrocarbon in the feed. At about 1400° F. reforming temperature this advantage was noted for space velocities up to about 400, the space velocity being defined as the cubic feet of gaseous hydrocarbons in the feed, measured at 70° F. and one atmosphere pressure, per volume of catalyst per hour. In all instances the amount of carbon dioxide consumed per mol of hydrocarbon reformed remained substantially constant.

An object of this invention is to provide an improved hydrocarbon reforming process.

Another object is to provide an improved process for the production of carbon monoxide and hydrogen from natural gas.

Still another object is to provide an improved method of operating a gas reforming unit whereby carbon monoxide and hydrogen are produced from natural gas in the presence of carbon dioxide and steam.

Still another object of this invention is to effect a reduction in the amount of carbon dioxide required in the feed to a gas reforming unit and an increase in the production of carbon monoxide and hydrogen without increasing the size of the equipment.

Other objects of this invention will be obvious to those skilled in the art from the accompanying disclosure and discussion.

The operating conditions for carrying out my improved process may vary considerably. The conversion temperature may range from about 1100 to about 2000° F., or higher, depending upon the particular apparatus used, catalyst employed, conversion desired, and the like. Usually I prefer to operate at a temperature in the range of from about 1300 to about 1800° F. The pressure employed may vary from about atmospheric up to 250 pounds per square inch or higher, but I prefer to operate at about atmospheric pressure. As to space velocity, I may employ a space velocity of the reactants through the reaction zone from about 200 to about 1000, or higher. The upper limit of space velocity is set by the lowest practicable conversion per pass for any given application, using hydrocarbon, steam and $CO_2$. The upper limit of space velocity also depends upon the specific apparatus used, catalyst employed and the desired extent of conversion. In some cases, particularly when operation is conducted at very high temperatures in the presence of a very active catalyst, the space velocity may be as high as 1000 or even higher.

A suitable catalyst for my process is reduced nickel oxide. Though the technique in preparing this catalyst may vary considerably, I prefer to support 20 to 25 per cent by weight nickel oxide on some form of clay, for example one-half inch clay rings. The catalyst is then conditioned, preferably in the reaction zone where it is to be used, in order to obtain maximum activity. This operation consists of steaming out the catalyst at a sufficiently high temperature to remove any carbonaceous material and then reducing the nickel oxide with hydrogen. The steaming out period may last for several hours but usually a period of time of from 5 to 10 hours is sufficient. During this period the temperature may be raised to 1200° F. or higher. After the steaming out period the catalyst is reduced with a mixture of steam and hydrogen in a ratio of about 3 to 5 at a temperature of about 1200° F. The reduction period may continue for a period of from about 3 to about 6 hours, however, a shorter period may be employed as the reduction would go to completion during reforming operation. Other catalysts may be used in my process, for example, nickel-thoria-magnesia and nickel-iron supported on kieselguhr; nickel-alumina-magnesia on active carbon; nickel-magnesia; nickel-alumina on clay. The percentage of the various ingredients may be varied considerably; also, the various combinations of the metal and oxides named may be used supported on suitable supports such as clay, active carbon or the like, or they may be used without the use of a support if desired.

By adjusting the steam and carbon dioxide in the feed the mol ratio of hydrogen to carbon monoxide may vary over a wide range, that is from about 6.3:1 to 1:1; however, the preferred mol ratio of hydrogen to carbon monoxide in the effluent gases is in the order of 3:1 to 1:1. The ratio obtained will depend on the relative amounts of carbon dioxide and steam, therefore in order to save process steam and carbon dioxide the concentration of these constituents in the feed should be as low as possible, but the extent to which the steam and carbon dioxide can be reduced is limited by carbonization of the catalyst.

Hydrocarbons other than methane may be used in my process. For example, hydrocarbons such as ethane, propane, butanes, their corresponding olefines, etc., may be employed.

The following example is illustrative of my invention.

A series of runs was made using a gas reforming furnace three inches in diameter by 20 feet in length charged with a ten foot catalyst bed, the catalyst comprising reduced nickel oxide, and operated at 1400° F. and at about atmospheric pressure. The results are given below in table form:

*Mols of $CO_2$ per mol of natural gas required in the feed to give a hydrogen to carbon monoxide ratio of two in the effluent product at the indicated mol ratios of water to natural gas in the feed*

| Space Velocity [a] | Mol Ratio of $H_2O$ to Natural Gas in Feed | | | |
|---|---|---|---|---|
| | 1.5 | 1.6 | 1.7 | 1.8 |
| | Mols $CO_2$ Required per Mol of Natural Gas in Feed | | | |
| 150 | [b]0.713 | [b]0.775 | [b]0.850 | ------ |
| 175 | 0.820 | 1.002 | 1.150 | 1.325 |
| 200 | 0.725 | 0.850 | 0.975 | 0.115 |
| 225 | 0.668 | 0.740 | 0.826 | 0.910 |
| 250 | 0.643 | 0.693 | 0.753 | 0.820 |
| | 0.640 | 0.689 | 0.732 | 0.782 |

[a] Volume of natural gas measured at 70° F. and one atmosphere in the feed per volume of catalyst per hour.
[b] Calculated thermodynamic equilibrium at 1400° F. based on natural gas. For example, the thermodynamic equilibrium value of 0.713 as it appears in the above table is calculated in the following manner. The carbon dioxide requirement for a product hydrogen to carbon monoxide ratio of 2:1 at chemical equilibrium is obtained by calculation. Since the residual amount of unreacted hydrocarbon at equilibrium is small, it can be neglected in the calculation for the purpose of simplifying the calculation and the error incurred will be negligible. At equilibrium, the components involved are $CO_2$, CO, $H_2$ and $H_2O$. Reaction among these components can be represented by the following stoichiometric equation:

$$CO_2 + H_2 \rightleftarrows H_2O + CO$$

The equilibrium constant expression is, assuming ideal gas laws, $$K = \frac{[\text{mols } H_2O][\text{mols } CO]}{[\text{mols } CO_2][\text{mols } H_2]}$$

The equilibrium constant K is calculated from standard free energy change for the above reaction by the thermodynamic relationship $$ln K = -\frac{\Delta °F.}{RT}$$

At 1400° F., $K = 0.832$. See Am. Pet. Inst., Research Project 44 at Nat. Bureau of Standards, "Selected values of properties of hydrocarbons," and Chem. Eng. Progress, 45, No. 7, pp. 452–453, July 1947.

The experimental work reported in the above table employed a natural gas having an analysis as follows:

Percent
$N_2$ ---------------------------------------------------------------- 7.8
$C_{1.22}H_{4.44}$ --------------------------------------------------- 91.6
$CO_2$ -------------------------------------------------------------- 0.6

Based on one pound mol of the above natural gas, the calculated value of the thermodynamic equilibrium ratio of carbon dioxide to natural gas is found as follows:

Let:
$P = H_2:CO$ ratio at equilibrium.
$S$ = mols steam or $H_2O$:natural gas ratio of feed.
$C$ = mols $CO_2$ or $CO_2$:natural gas ratio of feed.
$CO_2$, $CO$, $H_2$, $H_2O$ = mols of respective components at equilibrium.

Then:
By a carbon balance: $C + 0.916 \times 1.22 + 0.006 = CO_2 + CO$
By a hydrogen balance: $2S + 0.916 \times 4.44 = 2H_2 + 2H_2O$
By an oxygen balance: $S + 2C + 2 \times 0.006 = CO + H_2O + 2CO_2$ Solving, $$CO = \frac{4.238}{1+P}$$

$$CO_2 = C + 1.12 - \frac{4.238}{1+P}$$

$$H_2O = S + 2.03 - \frac{4.238P}{1+P}$$

$$H_2 = \frac{4.238P}{1+P}$$

Or, for $P = 2$ $CO = 1.413$
$CO_2 = C - 0.293$
$H_2O = S - 0.795$
$H_2 = 2.826$ Substituting in the equilibrium constant expression:

$$K = 0.832 = \frac{[S-0.795][1.413]}{[C-0.293][2.826]}$$

There is no unique solution for the above equation but for any value of S, there is a corresponding value of C which satisfies the equation. For example, if $S = 1.5$ mols of steam per mol of natural gas in the feed $$0.832 = \frac{[1.5-0.795][1.413]}{[C-0.293][2.826]}$$

$C = 0.713$ mol of $CO_2$ per mol of natural gas in the feed to yield a ratio of $H_2:CO = 2$ at equilibrium.

Other thermodynamic equilibrium values for the $CO_2$ to natural gas ratios as they appear in the above table are similarly calculated.

Thus it can be seen, for example, that at a mol ratio of steam to natural gas in the feed of 1.8 the mol ratio of carbon dioxide to natural gas required in the feed for the production of a mol ratio of hydrogen to carbon monoxide in the effluent of two is 1.325 at a space velocity of 150 and 0.782 at a space velocity of 250. A reduction of 0.543 mol of carbon dioxide per mol of natural gas in the feed is thereby effected. On a weight basis this represents a reduction of 1.495 pounds of carbon dioxide per pound of natural gas in the feed. Since in most instances the carbon dioxide eventually must be removed from the effluent gases by any suitable means such as caustic scrubbing and the like, it can be seen that by operating at a high space velocity a saving in carbon dioxide is obtained. Also, a further advantage is obtained in that a larger quantity of material can be handled by equipment of a given size giving a greater production of hydrogen and carbon monoxide without any serious reduction in quality by dilution with unconverted hydrogen.

My invention resides in the fact that an improved method of operation of a gas reforming unit for natural gas in the presence of steam and carbon dioxide can be effected by employing high space velocities. Higher yields of reformed gases of high quality are obtained for any given equipment size. The quantity of carbon dioxide consumed per mol of natural gas reformed is substantially equal at all space velocities, which means that the carbon dioxide conversion at higher space velocities is greater than at the lower space velocities. Consequently, less carbon dioxide is required in the feed per mol of natural gas for a given hydrogen to carbon monoxide ratio in the effluent gases. This is not what would normally be expected. Normally, increasing the space velocity will result in a lowered per cent conversion by reason of the reduced residence time in the conversion zone.

It is to be understood that this invention should not be unnecessarily limited to the above discussion and description and that modifications and variations may be made without departing substantially from the invention or from the scope of the claim.

I claim:

A process for the manufacture of synthesis gas containing a mol ratio of hydrogen to carbon monoxide of 2:1, which comprises passing a gaseous mixture consisting of natural gas, carbon dioxide and steam through a reaction zone containing a reduced nickel oxide catalyst at a space velocity of 200 to 250 volumes of gas per volume of catalyst per hour measured at 70° F. and at atmospheric pressure, maintaining a temperature in said reaction zone at about 1400° F. and at about atmospheric pressure, maintaining a mol ratio of carbon dioxide to natural gas in the range of 0.640 to 0.910, and a mol ratio of steam to natural gas in the range of 1.5 to 1.8, and recovering said synthesis gas as a product of the process.

BERTRAND J. MAYLAND.

REFERENCES CITED

The following references are of record in the file of this patent:

UNITED STATES PATENTS

| Number | Name | Date |
| --- | --- | --- |
| 1,711,036 | Beekley | Apr. 30, 1929 |
| 2,198,553 | Roberts | Apr. 23, 1940 |
| 2,266,989 | Radtke | Dec. 23, 1941 |
| 2,355,753 | Roberts | Aug. 15, 1944 |

OTHER REFERENCES

"Petroleum," June 1944, VII, 6, pp. 91 and 92.